United States Patent Office 2,842,346
Patented July 8, 1958

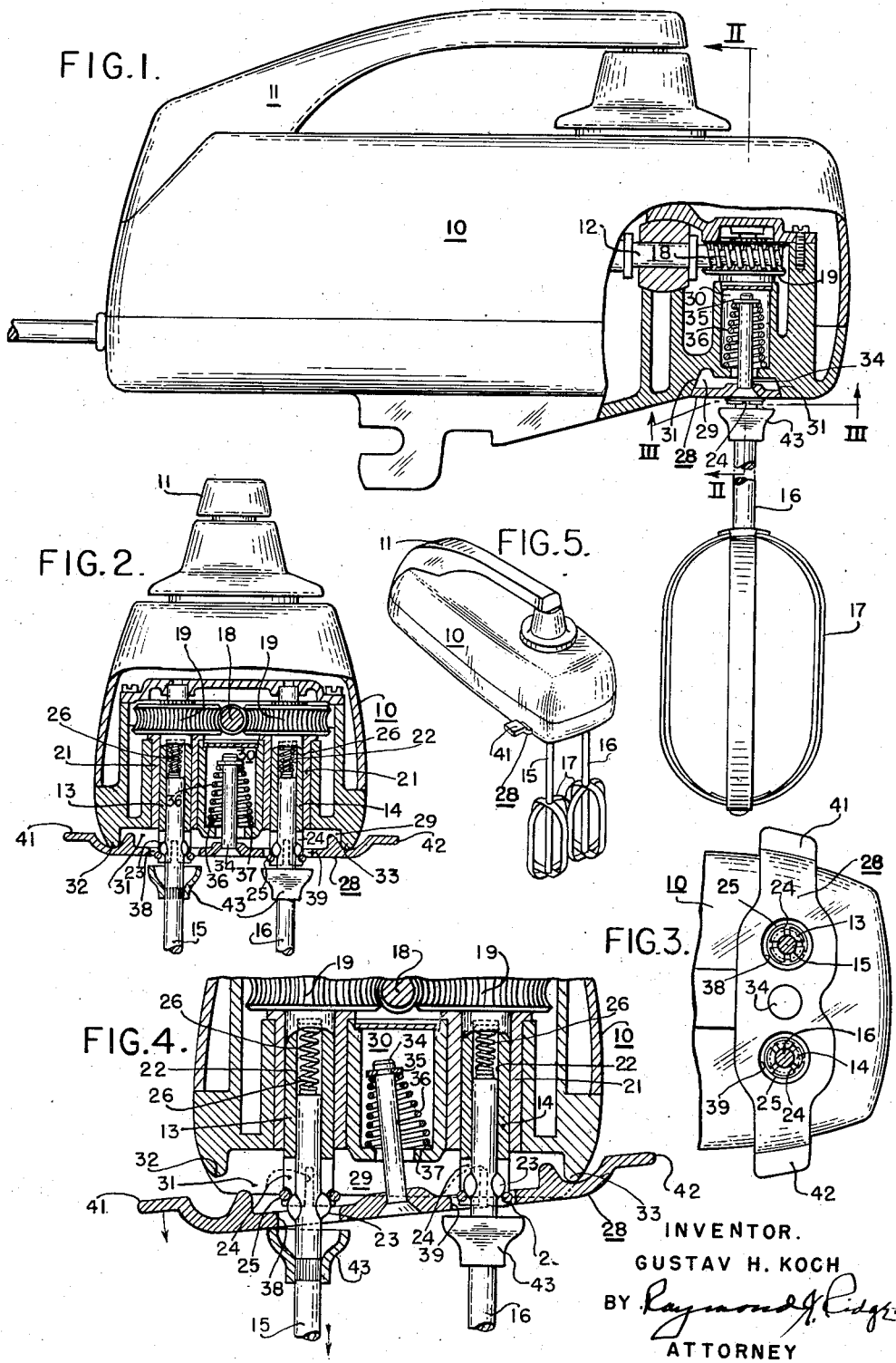

2,842,346
FOOD MIXER

Gustav H. Koch, Springfield, Mass., assignor to Westinghouse Electric Corporation, East Pittsburgh, Pa., a corporation of Pennsylvania Application March 21, 1956, Serial No. 573,010

3 Claims. (Cl. 259—1)

This invention relates to a food mixer of the household type and has for an object to provide improved apparatus of this kind.

A further object of the invention is to provide improved apparatus for readily detaching the beaters from the mixer structure, which apparatus is pleasing in appearance and easily cleaned.

A still further object of the invention is to provide an improved beater ejector for a mixer wherein the portions of the ejector which are susceptible of having food splashed or otherwise deposited thereon are of plain formation, accessible and readily cleaned.

In practicing the invention, a recess is formed in the bottom of the casing of a mixer, in which recess the lower ends of the rotary spindles carrying the beaters are disposed. An ejector plate closely fits within the walls forming the recess and has spaced openings receiving the lower ends of the spindles. The ejector plate is biased against end walls of the recess, defining seats for the plate, by a spring carried by the casing within the recess and engaging a stem fixed to the center of the plate. The plate is disposed above and adjacent shoulders carried by the shafts of the beaters during operation. The ends of the ejector plate form handles by which the plate may be tilted about one or the other of the seats for engaging the shoulder of a beater and ejecting the beater from its spindle. The plate may be manually displaced from the recess and turned about the axis of its stem in order to gain access to the recess walls and the rotary spindles for cleaning. The plate is simple in formation, pleasing in appearance and may be readily cleaned.

These and other objects are effected by the invention as will be apparent from the following description and claims taken in connection with the accompanying drawings, forming a part of this application, in which:

Fig. 1 is a side view, partially in section, of a mixer having beater ejecting means constructed in accordance with the invention;

Fig. 2 is a section taken along the line II—II of Fig. 1;

Fig. 3 is a section viewed from the plane III—III of Fig. 1;

Fig. 4 is an enlarged view similar to Fig. 2 but showing the beater ejecting plate moved to a position for ejecting one of the beaters; and Fig. 5 is a reduced scale perspective of the mixer.

Referring now to the drawing, a household food mixer is disclosed having a casing 10 and a handle 11. As is understood, the mixer may be carried by the handle 11 during a mixing operation or may be supported upon a suitable stand (not shown). The casing 10 houses a driving shaft 12 for a pair of hollow spindles 13 and 14, the latter driving respective shafts 15 and 16 of beaters, one of which is shown at 17. The shaft 12 is driven by a suitable motor, not shown, but housed within the casing 10. A worm 18 driven by the shaft 12 meshes with worm wheels 19 fixed to the upper ends of the spindles 13 and 14. The spindles 13 and 14 are rotatably supported within the casing 10, the principal support therefor being provided by sleeve bearings 21 carried by transversely spaced portions of the casing 10.

The shafts 15 and 16 of the beaters 17 are coupled to the spindles 13 and 14 in any suitable manner. As shown, the shafts 15 and 16 extend into axial bores 22 formed in the spindles 13 and 14 and are provided with a pair of curved outwardly extending keys 23 embossed or otherwise formed on a diameter of the shafts. These keys 23 are received by opposite radial slots 24 formed in the lower portions of the spindles 13 and 14. The shafts 15 and 16 are retained in position within the spindles 13 and 14 by spring C rings 25 seated within suitable annular grooves formed in the spindles 13 and 14 adjacent the lower ends thereof. In assembling a beater 17 to a spindle, for example, spindle 14, the beater shaft 16 is inserted in the bore 22 until the curved key 23 engages the lower side of the ring 25. A little axial force, sufficient to open the spring ring 25 is then applied, and the shaft moves to its coupled position with the key 23 above the ring 25, as shown in Fig. 2. Preferably, a compression spring 26 is suitably secured in each bore 22 for imparting a downward force to the shafts 15 and 16, which force, however, is not sufficient to open the C ring 25 and eject the shaft. The springs 26, during a mixing operation, permit the beaters 17 to move axially within the spindles in order to maintain uniform contact of the beaters with the bottom of the bowl containing the material being mixed. Accordingly, the springs 26 compensate for variations in the bottom surface of the bowl as well as variations in the positioning of the mixer upon its support. This functioning of the springs is referred to as "knee action" and is well understood in this art. As shown in Fig. 3, the spindles 13 and 14 may be assembled so that their slots 24 are displaced by 45 degrees whereby the beaters 17 may operate in paths which overlap, all of which is well understood. This displacement of the spindles 13 and 14 is not carried out in Figs. 2 and 4 for the sake of clearness of illustration.

In accordance with the present invention, improved means is provided for ejecting the beater shafts from the spindles, which means is of simple construction and pleasing appearance, important factors in household appliances, as is well appreciated. The ejecting means includes an ejector plate 28, preferably seated within a recess 29 formed in an under portion of the casing 10. As best shown in Fig. 1, the sides of the plate 28 snugly fit within sloped sidewalls 31 of the recess 29 and, as shown in Figs. 2 and 4, end portions of the plate rest upon seats 32 and 33 formed on the casing at the ends of the recess 29. The plate 28 is provided, centrally, with a stem 34 extending upwardly within a cavity 30 within the casing 10 and defining, in effect, an upward extension of the recess 29. The stem 34 is carried by the plate 28 in any suitable manner and has a collar 35 adjacent its upper end. The collar 35 is preferably a split spring ring fitted within a groove in the stem 34 in a well understood manner. A compression spring 36 biases the stem 34 upwardly, forcing the plate 28 into engagement with the seats 32 and 33. The spring 36 is interposed between the collar 35 and a ledge 37 formed within the casing 10.

The ejector plate 28 is provided with holes 38 and 39 through which the shafts 15 and 16 extend. Preferably, the spindles 13 and 14 extend downwardly through the holes 38 and 39 and terminate adjacent the lower surface of the plate 28. The outer ends of the plate 28 extend beyond the sides of the casing 10 and define handles 41 and 42 by which the plate 28 may be moved downwardly by the thumb or finger for the ejection of one or both beaters from their spindles. As shown, each shaft 15 and 16 is provided with a flared shoulder 43 disposed adjacent the bottom of the plate 28 in the operating position of the apparatus. The shoulders 43 are engaged by the plate 28 during the ejection of the beaters from the spindles, as will be described, and also serve, during operation of the mixer, as a slinger preventing material which may move up the beater shafts from entering the holes 38 and 39.

The coupling of the beater shafts to their respective spindles has been described heretofore. The uncoupling of the shafts and spindles will now be described. The operating position of the beater shafts is shown in Fig. 2. The beater shafts may be selectively ejected from the spindles by depressing one or the other of the handles 41 and 42. Complete depression of either handle will eject both beater shafts. When the handle 41 is depressed by the finger of the operator in opposition to the bias of spring 36, as shown in Fig. 4, the plate 28 moves about the seat 33 and engages shoulder 43 of shaft 15. The later is forced downwardly, the key 23 opening the C ring 25 on spindle 13. As the key 23 passes beneath the C ring, the beater shaft 15 is separated from the spindle 13. By further depressing the handle 41 from the position of Fig. 4, the plate 28 engages shoulder 43 of shaft 16 and disengages this shaft in the same manner as described for shaft 15. Accordingly, one beater shaft may be ejected by partially depressing the plate 28, or both may be ejected by completely depressing the plate 28. Similarly, the shaft 16 may be first ejected from the spindle 14 by partially depressing handle 42 for tilting the plate 28 downwardly about the seat 32. Complete depression of handle 42 will eject both shafts 15 and 16. The selective ejection of the beaters from the mixer, as described, is easily carried out even by one having very weak hands.

Cleaning of the ejector plate 28 and the surfaces of recess 29 may be readily carried out by moving the plate 28 from the confines of the recess 29 and then moving the plate 28 angularly about the axis of stem 34 about 90 degress. This operation provides access to the top of the plate 28 and the walls of the recess 29 for wiping. Since the spring 36 is disposed in the cavity 30 which is closed by the plate 28 during operation, fouling of the spring 36 by the material being mixed is precluded.

From the foregoing description, it is believed apparent that an improved ejector for the beaters of a household mixer is provided, wherein ejection of the beaters may be selectively carried out or the ejection of both beaters may be effected. The cleaning of the ejector mechanism is readily effected and the construction is such that the rotary spindles of the mixer and the spring associated with the ejector mechanism are protected by the ejector plate from material being agitated by the beaters. Furthermore, the improved ejector plate is of simple construction and may be readily blended with the casing to provide a pleasing appearance.

While the invention has been shown in but one form, it will be obvious to those skilled in the art that it is not so limited, but is susceptible of various changes and modifications without departing from the spirit thereof.

What is claimed is:

1. In a mixer, the combination of a casing having a recess formed in the outer portion thereof, a pair of hollow spindles journalled in the casing and extending into spaced portions of the recess, means for rotating said spindles, a pair of beaters having respective shafts, said spindles having respective bores for receiving the shafts of the beaters, means coupling the beater shafts to the spindles for rotation therewith, spring biased means for retaining the shafts within the spindles in coupled relation, an ejector plate having a center stem extending within said recess and openings spaced outwardly from the stem receiving the shafts of said beaters, a pair of seats formed on said casing and engageable with portions of the plate spaced outwardly from said openings therein, a spring carried by the casing within said recess for biasing the plate against said seats, said plate having terminal portions outwardly of said seats and defining handles by which the plate may be manually tilted about one or the other of said seats, and respective shoulders formed on said shafts and disposed adjacent said plate during operation of the mixer, said shoulders being selectively engaged by the plate when the latter is tilted about one or the other of said seats for the ejection of a beater from its respective spindle and in opposition to the spring biased retaining means associated with the spindle.

2. In a mixer, the combination of a casing having a recess formed in an under surface thereof, a pair of spaced spindles journalled in the casing and extending into said recess, motor-driven means for rotating the spindles, a pair of beaters having respective driving shafts, said spindles having axial bores for receiving the respective shafts, detachable means for coupling the shafts and spindles, resilient means retaining the shafts in their coupled position, an ejector plate seated within said recess and having a central stem extending within the recess, a spring carried by the casing and engaging said stem for biasing the ejector plate to its seated position, said ejector plate having openings on opposite sides of the stem for receiving the lower ends of said spindles, said ejector plate having end portions defining handles for manually tilting the plate about one or the other ends of the recess in opposition to said plate biasing spring, and respective shoulders formed on the beater shafts and disposed adjacent to the ejector plate during operation of the mixer, said shoulders being selectively engaged by the plate when the latter is tilted about one or the other ends of the recess for the ejection of a beater from its respective spindle and in opposition to said resilient means, said ejector plate being movable outwardly from the recess in opposition to said plate biasing spring and rotated about the spring for gaining access to the recess for cleaning.

3. In a mixer, the combination of a casing having a recess formed in the outer portion thereof, a pair of hollow spindles journalled in the casing and extending into spaced portions of the recess, means for rotating said spindles, a pair of beaters having respective shafts, said spindles having respective bores for receiving the shafts of the beaters, means coupling the beater shafts to the spindles for rotation therewith, spring biased means for retaining the shafts within the spindles in coupled relation, an ejector plate substantially covering the recess and having spaced openings receiving said shafts, respectively, said casing having a seat formed thereon at one end of said recess and engageable with one end of said plate spaced outwardly from one of said openings therein, biasing means within said recess for urging said plate into contact with said seat, said plate having a terminal portion defining a handle for tilting the plate about said seat, and respective shoulders formed on said shafts and disposed adjacent the plate during operation of the mixer, said shoulders being sequentially engaged by the plate when the latter is tilted about said seat for the sequential ejection of the beater shafts from their respective spindles.

References Cited in the file of this patent

UNITED STATES PATENTS

| | | |
|---|---|---|
| 2,048,455 | Knapp | July 21, 1936 |
| 2,101,980 | Brunner | Dec. 14, 1937 |